W. DOMANN & H. McPHEE.
DETACHABLE CLOSURE FOR COOKING VESSELS.
APPLICATION FILED JUNE 19, 1913.
1,126,730.  Patented Feb. 2, 1915.
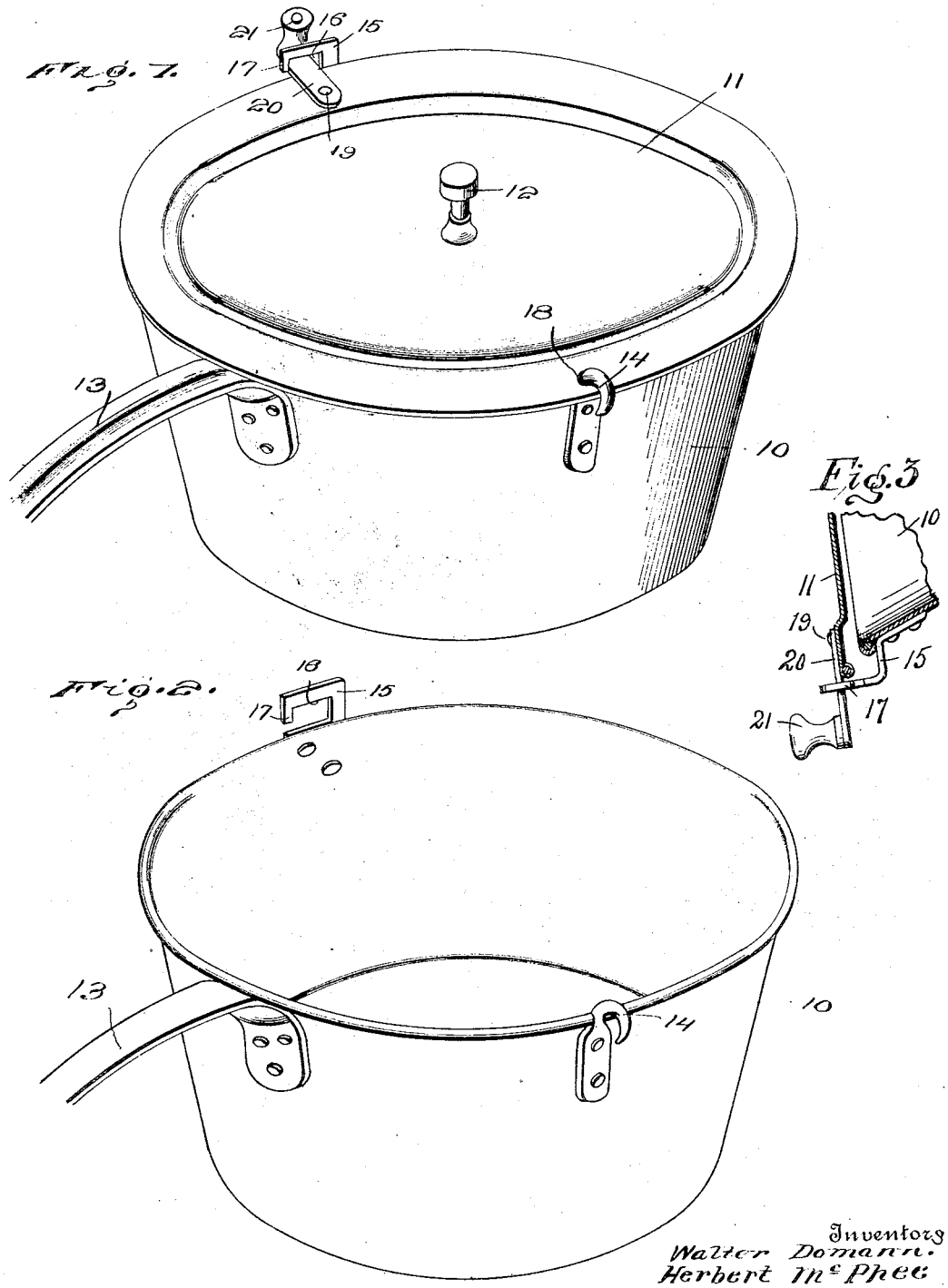

UNITED STATES PATENT OFFICE.

WALTER DOMANN AND HERBERT McPHEE, OF LEAVENWORTH, WASHINGTON.

DETACHABLE CLOSURE FOR COOKING VESSELS.

1,126,730.

Specification of Letters Patent.

Patented Feb. 2, 1915.

Application filed June 19, 1913. Serial No. 774,668.

*To all whom it may concern:*

Be it known that we, WALTER DOMANN, a subject of the Emperor of Germany, (who has declared his intention of becoming a citizen of the United States,) and HERBERT McPHEE, a citizen of the United States, both residing at Leavenworth, in the county of Chelan and State of Washington, have invented certain new and useful Improvements in Detachable Closures for Cooking Vessels, of which the following is a specification.

This invention relates to cooking vessels, and has for one of its objects to provide a simply constructed closure for the vessel which may be readily attached and detached when required, and which is sufficiently movable to permit the free flow of water from the cooked articles without permitting the articles to escape, and without the necessity for manually manipulating or holding the cover.

With these and other objects in view the invention consists in certain novel features of construction as hereinafter shown and described and then specifically pointed out in the claim, and in the drawings illustrative of the preferred embodiment of the invention.

Figure 1 is a perspective view of the improved device. Fig. 2 is a perspective view of the vessel with the cover removed. Fig. 3 is a sectional detail illustrating the operation of the device.

Corresponding and like parts are referred to in the following description and indicated in all the views of the drawings by the same reference characters.

The improved device may be applied to any of the various forms of cooking vessels with which a closure is employed, such as stewpans, kettles, and the like, and it is not desired therefore to limit the invention to any specific form of vessel, but the improved device is applicable more particularly to stewpans and like vessels, and for the purpose of illustration is shown applied to a vessel of this character, the body of the vessel being indicated conventionally at 10 and the closure at 11, the latter having a lifting knob or like device 12. Connected to the body 10 of the vessel is a laterally directed handle 13 of the usual form. Connected to the body 10 at one side and preferably at right angles to the longitudinal plane of the handle, is a downwardly directed hook 14 which extends beyond the edge of the vessel. Attached to the vessel at the opposite side is a catch device 15 having an open throat 16 with the terminal 17 of the upper portion of the clip directed downwardly into the opening 16. By this means a stop shoulder is formed by the downwardly directed portion 17. The closure 11 is provided with an aperture 18 to engage over the hook 14 and thus secure the closure in hinged relation to the body. Pivoted at 19 to the closure at the side opposite to the aperture 18 is a lever arm 20 having an operating device such as a knob 21 at its free end. The lever arm or bar 20 extends through the opening of the clip 15 and engages in the rear of the downwardly directed stop 17. The opening 16 is of greater extent than the thickness of the lever arm 20 so that the rim is free to move upwardly together with the closure 11 to a certain extent and thus enable the closure 11 to be moved away from the body 10 at the side next to the clip to provide for the necessary drainage, while at the same time the lever arm 20 is held from displacement by the depending terminal 17 of the clip. Thus when the water is to be drained from the body 10 the body is inverted with the effect of causing the closure 11 to be moved outwardly at one side within the range of the opening 16 of the clip, and thus space the closure from the body to permit a requisite drainage, while at the same time prevent the escape of the articles that have been cooked, the latter being retained within the vessel when the latter is overturned. When the drainage is completed the vessel is restored to position and the cover removed by displacing the lever arm 20 turning the cover back upon the hook 14 as a hinge. If the closure is to be removed the downward movement is continued until the aperture 18 is separated from the hook 14.

The improved device is simple in construction can be inexpensively manufactured and applied to closures and vessels of any required size.

Having thus described the invention, what is claimed as new is:

A device of the class described comprising a vessel, a cover for said vessel and movably connected thereto at one side, a catch device attached to said vessel and having an opening therethrough, said catch device having a contracted passage leading into said opening at one end, the bottom of the passage and the bottom of the opening being continuous and without obstruction and the portion of the end of the catch device above the passage forming a stop with its inner wall extending in parallel relation to the vertical axis of the catch, and a holding member carried by the cover and insertible into the opening through the passage and prevented from lateral displacement by the stop when the vessel is overturned.

In testimony whereof we affix our signatures in presence of two witnesses.

WALTER DOMANN. [L. S.]
HERBERT McPHEE. [L. S.]

Witnesses:
E. M. HINMAN,
L. J. NELSON.